(12) United States Patent
Hasei (10) Patent No.: US 7,265,907 B2
(45) Date of Patent: Sep. 4, 2007

(54) METHOD OF MANUFACTURING MICROLENS, MICROLENS, OPTICAL FILM, SCREEN FOR PROJECTION, AND PROJECTOR SYSTEM

(75) Inventor: Hironori Hasei, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 8 days.

(21) Appl. No.: 10/926,983

(22) Filed: Aug. 27, 2004

(65) Prior Publication Data

US 2005/0088750 A1  Apr. 28, 2005

(30) Foreign Application Priority Data

Sep. 3, 2003 (JP) .............................. 2003-311406

(51) Int. Cl.
  G02B 27/10  (2006.01)
  G02B 3/00   (2006.01)
  B29D 11/00  (2006.01)
(52) U.S. Cl. ...................................... 359/619; 264/1.32
(58) Field of Classification Search ........ 359/619–620, 359/623, 626; 264/1.1, 1.32, 1.38
See application file for complete search history.

(56) References Cited

U.S. PATENT DOCUMENTS

| | | | |
|---|---|---|---|
| 5,694,246 A * | 12/1997 | Aoyama et al. ............. | 359/619 |
| 5,707,684 A | 1/1998 | Hayes et al. | |
| 6,734,031 B2 * | 5/2004 | Shizukuishi ................. | 438/22 |
| 6,814,901 B2 * | 11/2004 | Itoh ........................... | 264/1.38 |
| 2002/0145807 A1 * | 10/2002 | Nishikawa ................... | 359/619 |
| 2004/0226929 A1 * | 11/2004 | Miura et al. ........... | 219/121.85 |
| 2005/0067944 A1 * | 3/2005 | Masuda et al. ............ | 313/501 |

FOREIGN PATENT DOCUMENTS

| | | | |
|---|---|---|---|
| EP | 1251365 A1 * | 10/2002 | |
| JP | 60007723 | * | 1/1985 |
| JP | A 2001-083304 | 3/2001 | |
| JP | A 2002-31842 | 1/2002 | |
| JP | A 2003-279709 | 10/2003 | |

* cited by examiner

*Primary Examiner*—Alicia M Harrington
(74) *Attorney, Agent, or Firm*—Oliff & Berridge, PLC (57) ABSTRACT

Exemplary embodiments of the present invention provide an optimal manufacturing method of a microlens to diffuse light. According to exemplary embodiments, a manufacturing method of microlens includes forming a generally convex shaped lens portions made from a light transmissive resin on a substrate having light transmissivity, and curing the lens portions, forming the lens portions being a process in which a plurality of the lens portions are formed so as to be coupled on the substrate.

9 Claims, 10 Drawing Sheets

METHOD OF MANUFACTURING MICROLENS, MICROLENS, OPTICAL FILM, SCREEN FOR PROJECTION, AND PROJECTOR SYSTEM

BACKGROUND OF THE INVENTION

1. Field of Invention

The present invention relates to a method of manufacturing a microlens, a microlens, an optical film, a screen for projection and a projector system.

2. Description of Related Art

Figure 11:
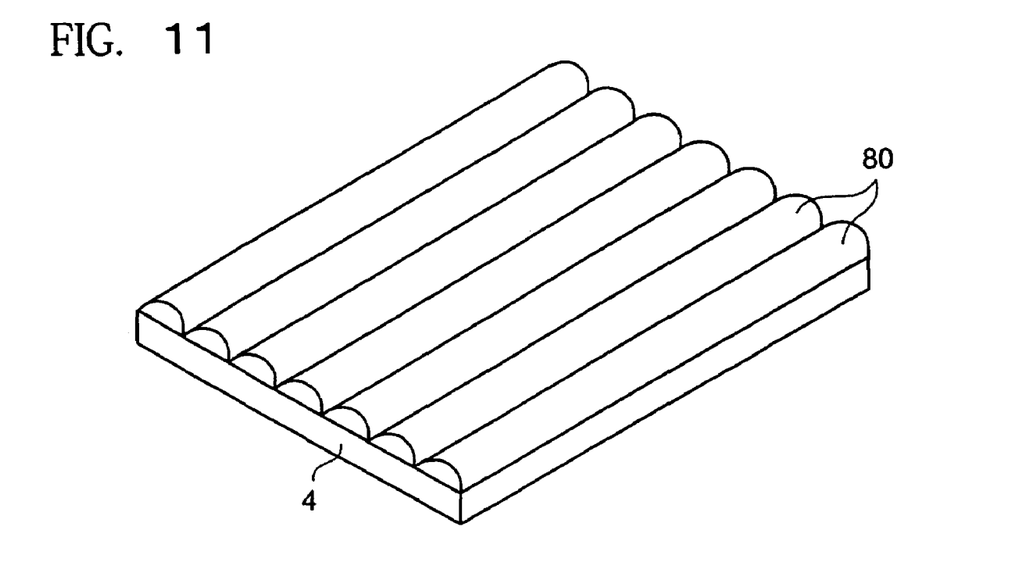
FIG. 11 is a schematic outlined view showing an example of related lenticular sheet.

The related art includes lens portions of a lenticular sheet included in a screen for projection, as shown in FIG. 11. The lens portions are in a shape in which a plurality of half-cylindrical shaped cylindrical lenses 80 are disposed on a transparent substrate 4 so that their longitudinal directions are parallel. The lenses have a function to diffuse light to the longitudinal direction and perpendicular direction. For this reason, the lens portions of the lenticular sheet have an effect to enlarge the visible range of the image or the like projected on the screen. Specifically, the effect is to enhance or improve visibility from directions other than the front of the screen. For example, the shape is shown in related art document Japanese Unexamined Patent Application No. 2002-31842 (FIG. 44). The lens portions of this lenticular sheet are generally manufactured by molding resin by an injection molding machine using a die.

SUMMARY OF THE INVENTION

However, in related art manufacturing methods of the lens portions (cylindrical lens 80) of the lenticular sheet that are manufactured by injection mold using a die, it is difficult in scale-up of machine and facility. Further, there is a high cost to manufacture a lens adaptable to the screen for large-sized projection, for example, of 50 inches. Furthermore, in order to respond to demand on the lens portions of the various sized lenticular sheets, many dies have to be stored, which lead to a burden on storage space, financial aspects, or the like. Furthermore, the cylindrical lens 80 of the lens portions of the lenticular sheet diffuse light in the longitudinal direction and the perpendicular direction, however, diffuses little light in the other directions, thus visibility in all directions may not be provided.

Thus, exemplary embodiments of the present invention provide a manufacturing method of a microlens in which the microlens having wide diffusibility, formed on a substrate so as to couple a plurality of very small lenses, is used for the lens portions of the lenticular sheet to further form each microlens portion by a droplet discharging device, a microlens, an optical film, a screen for projection and a projector system.

A manufacturing method of the microlens according to exemplary embodiment of the present invention includes: forming a generally convex shaped lens portions made from a light transmissive resin on a substrate having light transmissivity and curing the lens portions. Forming the lens portions being a process in which a plurality of the lens portions are formed so as to be coupled on the substrate.

According to this exemplary manufacturing method, because the lens portions are formed so as to be coupled over the entire surface of the substrate, a microlens can be manufactured in which the individual lens portions have light diffusibility and the entire substrate has light diffusibility. Incident light on this microlens passes through the substrate and is evenly diffused. For example, if this is applied to the screen for projection, the screen for projection provides an image that can be recognized not only from the front of the screen for projection but also from upper, lower, right and left directions.

In this case, forming the lens portions includes discharging a droplet of the light transmissive resin from the droplet discharging device.

According to this structure, in this manufacturing method, the lens portions are formed one by one up to a predetermined number by discharging the droplet from the droplet discharging device. This method can be easily adaptable to various sized substrates by controlling the droplet discharging device. Furthermore, for array of the lens portions, the lens portions can be also formed in various arrays by controlling the droplet discharging device. Accordingly, a cost reduced microlens with a more flexible size of the substrate and a more flexible array of the lens portions can be manufactured in contrast to the manufacturing with the injection molding using a die in the related art.

Furthermore, forming the lens portions includes a first process to space a row, on which the lens portions are coupled and extended, in a predetermined interval and to form a plurality of the arrows. A second process is provided to cure the lens portions formed in the first process, and a third process to further form the row on which the lens portions are coupled and extended between the plurality of the rows formed in the first process.

According to this exemplary manufacturing method, by forming the lens portions in the first process and the third process separately, the lens portions between each row can be reduced or prevented from being closely coupled more than necessary and the shape of the lens portions can be reduced or prevented from collapsing.

In this case, the lens portions formed in the first process and the third process are formed by processes of discharging respectively, different droplet of the light transmissive resin.

According to this structure, formation of the lens portions are not only divided twice, material type of the droplet to be discharged is also changed. Accordingly, each lens portions can be reduced or prevented from being closely coupled more than necessary and the lens portions having a more accurate shape can be manufactured.

Furthermore, discharging the droplet is a process to discharge the droplet in which light diffusive particles are mixed and dispersed in the light transmissive resin. Further a process is provided to carry out liquid repellent processing on the surface of the substrate on which the lens portions are formed.

According to these structures, enhancement of light diffusibility of the lens portions can be obtained by mixing and dispersing the light diffusive fine particles in the light transmissive resin. Furthermore, by carrying out liquid repellent processing on the surface of the substrate, the droplet discharged on the substrate becomes a more rounded shape, and a function as a lens becomes better.

A microlens according to exemplary embodiments of the present invention include a substrate having light transmissivity, and lens portions of a generally convex shape made from a curable light transmissive resin formed on the substrate. A plurality of the lens portions are formed so as to cover the entire surface of the substrate and be coupled to each other on the substrate. The lens portions include the lens portions made from the different light transmissive resins, and this light transmissive resin preferably contains the light diffusive particles. Moreover, the surface forming the lens portions of the substrate, preferably have liquid repellency.

In these structures, the lens portions are formed on the entire surface of the substrate, and a microlens can be obtained which can evenly diffuse light in wide directions by an assembly of the lens portions. In addition, in order to increase performance of the microlens, light diffusibility is enhanced by using the light transmissive resin in which the light diffusive particles are mixed for formation of the lens portions. Better convex shape of the lens portions are formed by carrying out the liquid repellent processing on the surface of the substrate.

The optical film according to exemplary embodiments of the present invention, includes a substrate having light transmissivity made from a sheet or a film having light transmissivity, and a microlens formed on the sheet or the film having light transmissivity.

According to this structure, by forming the microlens on the film, the optical film having wide light diffusibility and even light diffusibility without inconsistency, can be addressed.

The screen for projection according to exemplary embodiments of the present invention is the screen for projection having a fresnel lens and a lenticular sheet, and uses the optical film as the lenticular sheet.

According to this structure, the screen for projection evenly displayed projected images without inconsistency, can be obtained by using the optical film having the microlens for the lenticular sheet.

A projector system according to exemplary embodiments of the present invention includes: a light source; light modulating device disposed on a light axis of light emitted from the light source and modulating light from the light source; an imaging optical system imaging the light modulated by the light modulating device; and a screen forming projected images by projecting images which are imaged by the imaging optical system, the screen for projection being used as the screen.

According to this structure, there is provided a visible projector system in which image displayed on the screen for projection can be seen from wide directions.

According to the manufacturing method of a microlens of exemplary embodiments of the present invention, the various sized microlens can be flexibly manufactured by a droplet discharging device without using expensive dies or the like. Further, loss of material such as a gate portion when the die is used, can be eliminated, and at the same time the cost can be reduced. Furthermore, a microlens having uniform light diffusibility as a surface of the entire substrate can be manufactured by forming a plurality of lens portions on the entire surface of the substrate.

DETAILED DESCRIPTION OF PREFERRED EMBODIMENTS

A manufacturing method of a microlens according to exemplary embodiments of the present invention is described with reference to the attached drawings.

Figure 7:
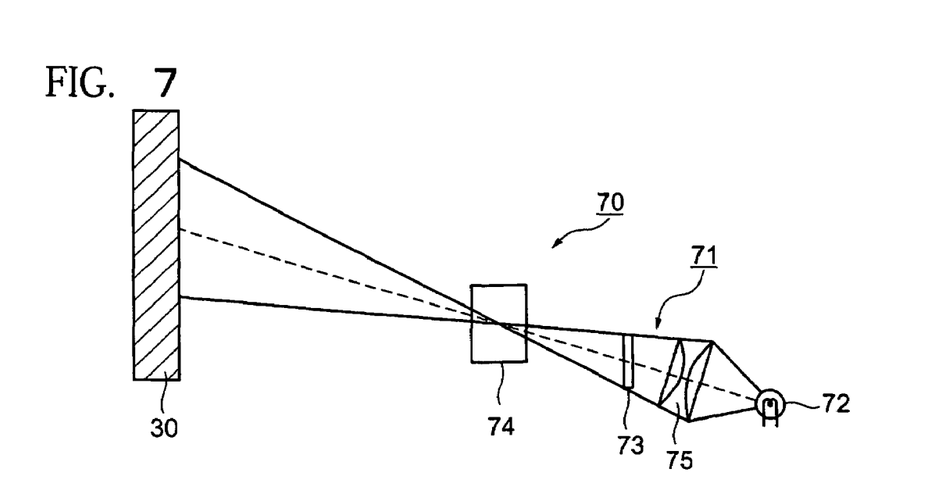
FIG. 7 is a schematic outlined structural view showing a projector system.

At first, as an example of the microlens being used effectively, a screen for projection used in a projector system is schematically described. As shown in FIG. 7, a projector system 70 includes a projector 71 and a screen 30 for projection (hereinafter, referred to as screen), and the projector 71 includes a light source 72 such as mercury lamp, a lens group 75 to guide light from the light source 72 to a liquid crystal light bulb including a liquid crystal panel, the liquid crystal light bulb (light modulating device) 73 modulating light passing through the liquid crystal panel and sending out the light as an image to be projected, and an imaging lens (imaging optical system) 74 imaging the image of light passed through the liquid crystal light bulb 73 on to the screen 30. In the projector system 70 of such a structure, in order to see the image projected on the screen 30, there is a front projection method to see the image projected on the screen 30 from the same side as the projector 71, and a rear projection method to see image passed through on the screen 30 from the opposite side of the projector 71, which have a similar structure, therefore, here, the rear projection methods is described as an example.

The projector system 70 is a system in which, basically, light of the light source 72 collected by the lens group 75 is passed through a liquid crystal panel of the liquid crystal light bulb 73, and the image displayed on the liquid crystal panel is projected on the screen 30 through an imaging lens 74. In order to make the system compact, a mirror and a prism are installed in a light passage.

Figure 6:
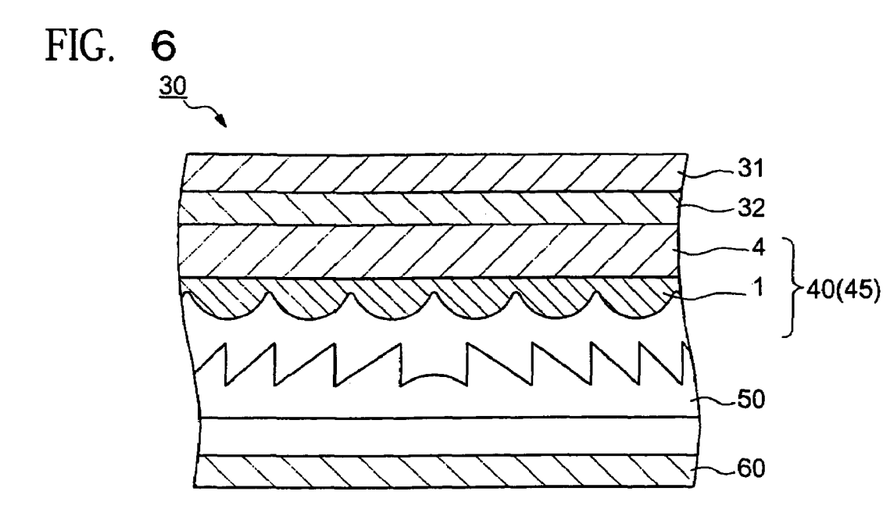
FIG. 6 is a schematic sectional view of a screen for projection mounting a lenticular sheet (optical film) on which a microlens is formed.

As shown in FIG. 6, the screen 30 on which an image is projected includes a film base material 31, a lenticular sheet 40 disposed on the film base material 31 through an adhesive layer 32, and a fresnel lens 50 sequentially disposed on the lenticular sheet 40 and a scattering film 60. The lenticular sheet 40 includes a transparent substrate 4 and a microlens 1 formed on the transparent substrate 4, which is an optical film 45 in exemplary embodiments of the present invention.

An optical film of the related art includes the transparent substrate 4 and a cylindrical lens 80 as shown in FIG. 11, and can expand a visible range of the image by diffusing light. The optical film 45 having microlens 1 of exemplary embodiments of the present invention, in place of the cylindrical lens 80 can remarkably reduce the manufacturing cost, and further expand the diffusion of light. A manufacturing method of the microlens will be described in detail below.

Exemplary Embodiment

Figure 1:
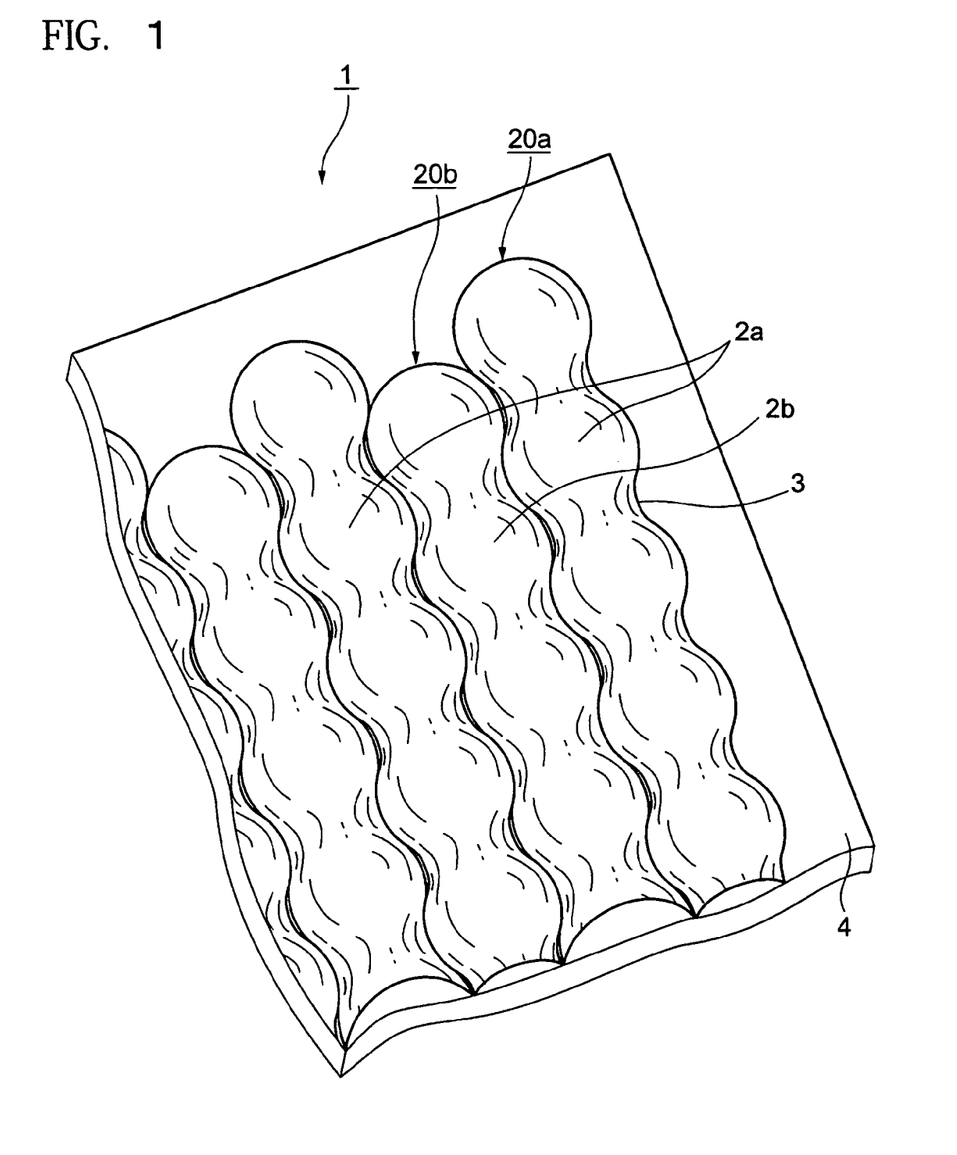
FIG. 1 is a schematic outlined perspective view of a microlens according to exemplary embodiments of the present invention.

A microlens 1 manufactured by a manufacturing method of the microlens according to exemplary embodiments of the present invention, as shown in FIG. 1, includes a row 20a formed so that a plurality of lens portions 2a are linearly disposed on one surface of a transparent substrate. Adjacent lens portions 2a are respectively coupled by constricted portions 3, and a row 20b is formed in the same way, so that a plurality of lens portions 2b are linearly disposed so as to contact the row 20a of the lens portions 2a, and adjacent lens portions 2b are respectively coupled by the constricted portions 3. The row 20a and the row 20b are alternately disposed sequentially and form the microlens 1 so as to cover the entire surface of the transparent substrate 4.

Figure 2A:
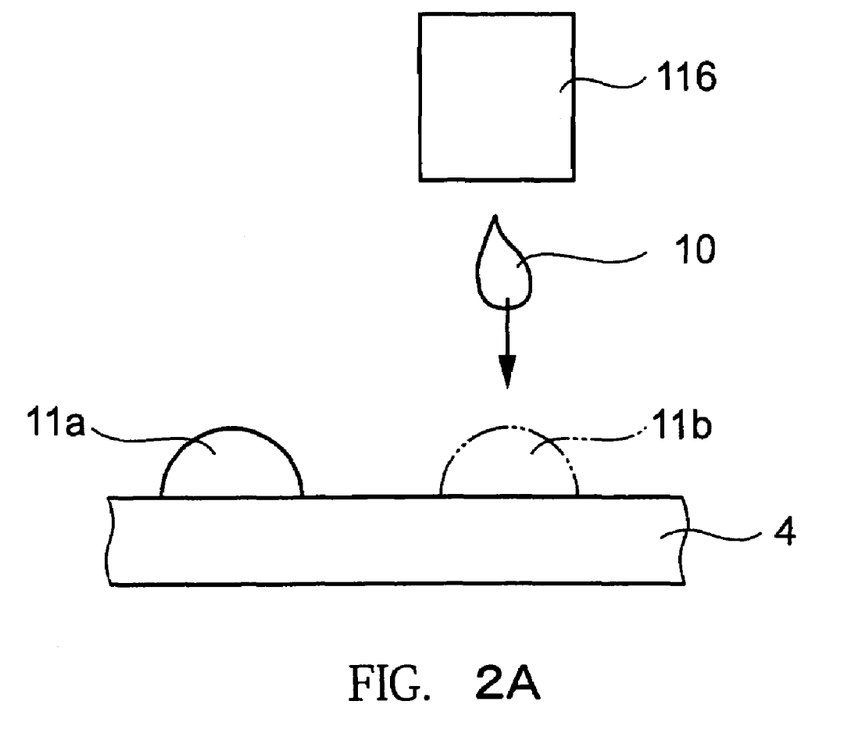
FIGS. 2A-B are schematics showing a method of forming lens portions by discharging a droplet.
Figure 2B:
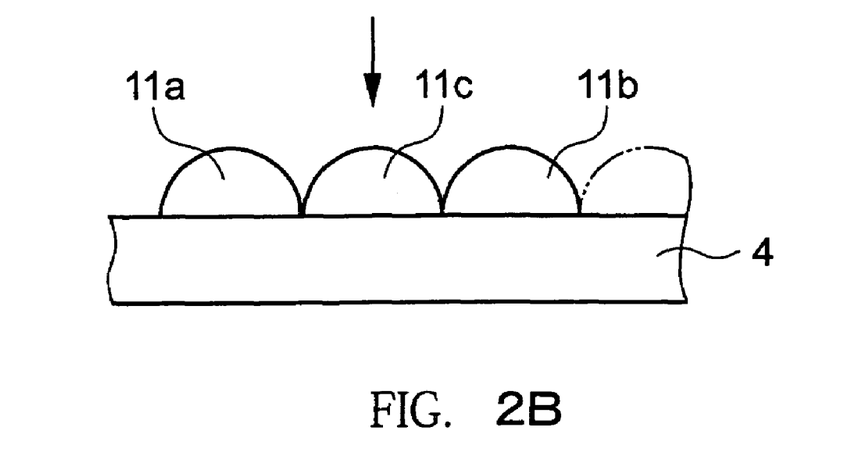
Figure 3:
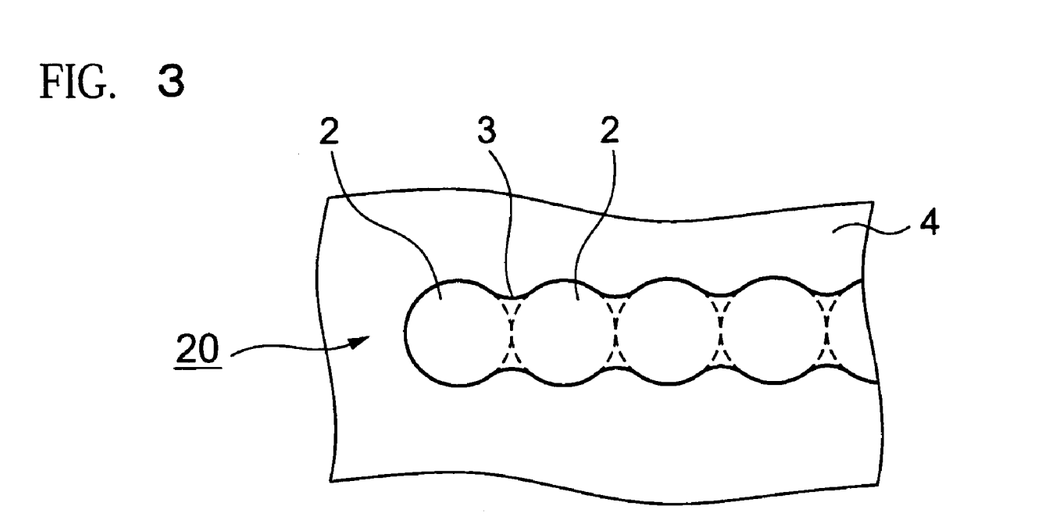
FIG. 3 is a schematic plan view showing a touching down state of the droplet.

A manufacturing method of the microlens is described with reference to FIG. 1 through FIG. 5. As shown in FIG. 2(A), a generally spherical droplet 10 of a light transmissive resin is discharged onto a surface of the transparent substrate 4 having liquid repellency, from a discharging head 116 of a droplet discharging device described later. The droplet 10 becomes a generally semi-spherical lump 11a on the transparent substrate 4. Next, the discharging head 116 moves relative to the transparent substrate 4, spaces an interval equivalent to the lump 11a between the lump 11a, and discharges droplet 10 which becomes a lump 11b. Then, in the same way, the lumps 11 are sequentially formed in linearity. Next, after each of the lumps are processed by curing, as shown in FIG. 2(B), the droplet 10 is discharged between the lump 11a and 11b, and a lump 11c is formed. Each of the lumps 11 are lens portions 2, and discharged and disposed to contact each other, the adjacent lens portions 2 are coupled, the generally semi-spherical shaped spherical heads are coupled, and they are of flat shape as viewed from the cross section. FIG. 3 shows this state in plan, the constricted portions 3 are formed by coupling coupled portions of each lens portions 2 disposed so as to be coupled. Each lens portion 2 being coupled at the constricted portion 4 are linear and form row 20. As described above, in the row 20, the cross section in longitudinal direction in linearity, is a shape in which heads of the lens portions 2 are flatly coupled, and the cross section perpendicular to the longitudinal direction is spherical.

Figure 4:
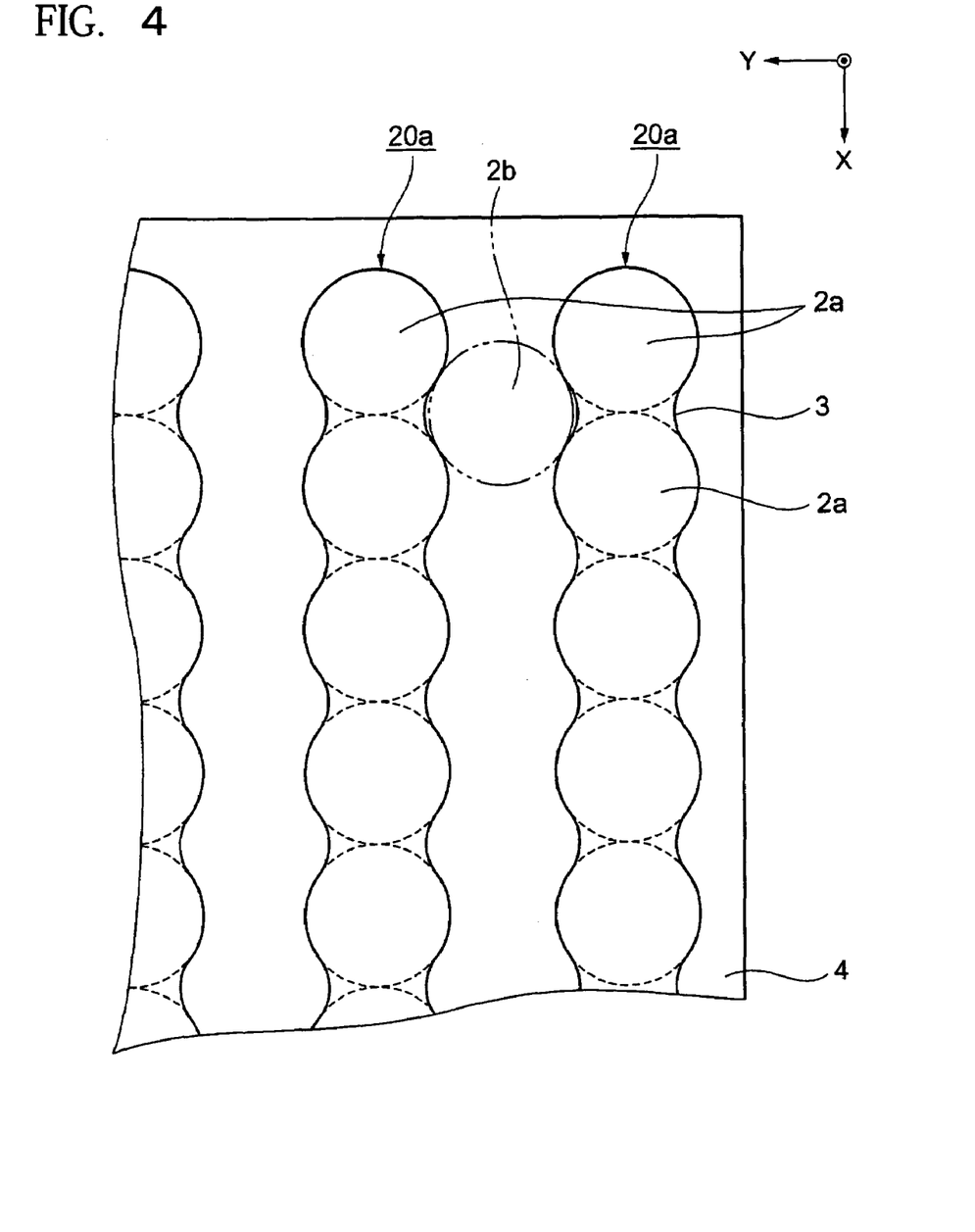
FIG. 4 is a schematic plan view showing a row on which lens portions are formed.
Figure 5:
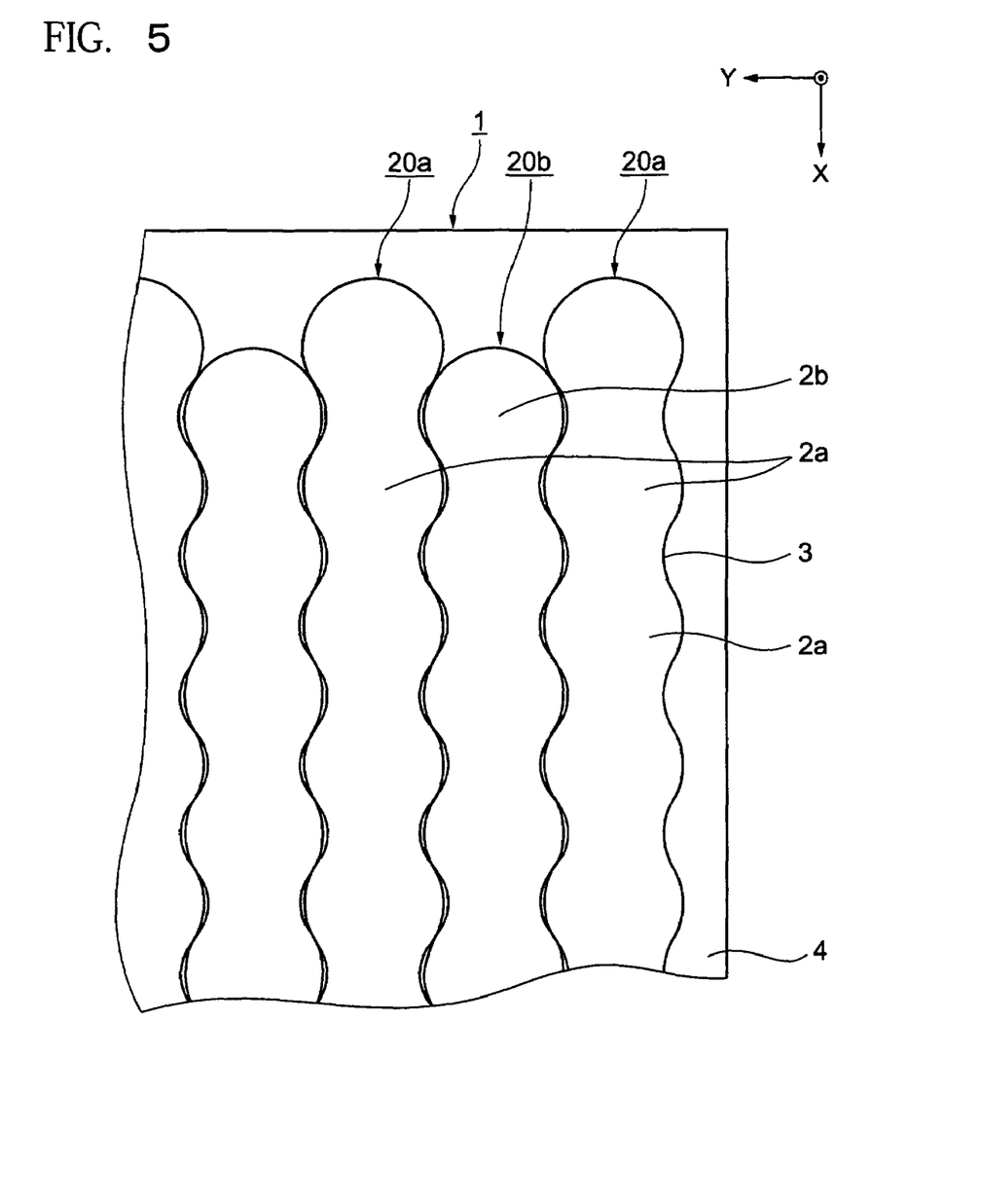
FIG. 5 is a schematic plan view showing a microlens according to exemplary embodiments of the present invention.

Next, as shown in FIG. 4, according to the process described in FIG. 2(A), a plurality of the rows 20a formed by the lens portions 2a and the constricted portions 3 are disposed in parallel on the transparent substrate 4 with constant interval. This is a first process to form the lens portions 2. A second process cures the plurality of the row 20a which is disposed. A third process is carried out to form the row 20b of the lens portions 2b with same size as that of the lens portions 2a between a plurality of the rows 20a already disposed on the transparent substrate 4 according to the process described in FIG. 2(A), and then the row 20a and 20b are formed on the whole surface of the transparent substrate 4. After this, curing process is carried out again. FIG. 4 is a schematic showing a first lens portions 2b formed in the third process, and the lens portions 2a are shifted to the row direction by radius dimension (half pitch) of the lens portions 2a relative to the lens portions 2a in the row 20a, and disposed so as to contact the constricted portions 3 in the row 20a. By the above respective processes, as shown in FIG. 5, the microlens 1 in which the rows 20a by the lens portions 2a and the rows 20b by the lens portions 20b are alternately formed on the transparent substrate 4 is completed.

In this exemplary embodiment, the size of the droplet 10 is set to be 4 pl (pico liter), and the diameter of the lump 11 which is touched down on the transparent substrate 4 and becomes semi-spherical is set to be 30 μm. The rows 20 are formed that have length and a number of rows suitable for the size of the transparent substrate 4. These settings can be changed by controlling the droplet discharging device 100 described later, and easily adaptable to the various sized microlens. Furthermore, even if the lens portions 2a and 2b are formed by using the same light transmissive resins, the lens portions 2a and 2b not treated by a curing process, and are not coupled by the constricted portions 3 and not mixed to each other. That is, the lens portions 2a are treated by a curing process and then the lens portions 2b is formed, however, it is preferable to use the different light transmissive resin to make the boundary of the layer apparent.

In this microlens 1, each row of the row 20a and 20b are in an array same as that of the cylindrical lens 80 in FIG. 11. Further, the constricted portions 3 are formed, and the side faces are spherical, thereby the light diffusing directions are in multi-directions than those of the cylindrical lens 80. In other words, if the microlens 1 is used for the screen 30 of the projector system 70, the screen 30 has a wider visibility.

In addition, as a material for the transparent substrate 4, for example, if the microlens 1 is applied to the optical film 45 for the screen 30, a transparent sheet or a transparent film made from cellulosic resin, such as cellulose acetate and propyl cellulose, light transmissive resin such as polyvinyl chloride, polyethylene, polypropyrene and polyester, are used. Furthermore, as the transparent substrate 4, light transmissive materials such as glass, polycarbonate, polyarylate, polyethersulfone, amorphous polyolefine, polyethylene terephthalate, polymethyl methacrylate, can also be used.

In order to allow the transparent substrate 4 to have liquid repellency, as an example, liquid repellent processing is carried out by a plasma polymerization method. In this plasma polymerization method, a raw liquid for liquid repellent processing is prepared, and as the raw liquid, liquid organic substances composed of a linear PFC such as $C_4F_{10}$ or $C_8F_{18}$ are preferable. When steam of such raw liquid is made into plasma by a plasma processing device, a part of a bond of the linear PFC is cut and activated by the fact that steam of this linear PFC is made into plasma. When a part of such a bond is cut and the PFC which is activated reaches the surface of the transparent substrate 4, these PFCs are mutually polymerized on the transparent substrate 4 and become a fluorine resin polymerized film having liquid repellency. In addition, as the raw liquid for liquid repellent processing, for example, dacatriene can also be used. In this case, by adding $CF_4$ which was activated by plasma processing or oxygen, liquid repellency can be given to the polymerized film obtained, and a liquid repellent polymerized film can be formed. Furthermore, as the raw liquid for liquid repellent processing, fluorocarbon can be also used. In this case, by adding $CF_4$ which was activated by being made into plasma, even if a part of fluorine in fluorocarbon which is a raw material is removed by being made into plasma, the active fluorine is captured into the polymerized film obtained. Therefore, the liquid repellency of fluorine resin polymerized film formed can be enhanced. In this way, the transparent substrate 4 having liquid repellency can be manufactured.

Furthermore, as the light transmissive resin forming the lens portions 2a and 2b, acrylic resins such as polymethylmethacrylate, polyhydroxy ethyl methacrylate, polycyclohexyl methacrylate, allyl resins such as polydiethylene glycol-bis-allyl carbonate, polycarbonate, thermoplastic or thermosetting resins such as methacryl resin, polyurethane resin, polyester resin, polyvinyl chloride resin, polyvinyl acetate resin, cellulose resin, polyamide resin, fluorine resin, polypropylene resin, polystyrene resin are used, and one type of these or some types of these are mixed to be used. In addition, by mixing a photo polymerization initiator such as biimidazole compound, into the light transmissive resin, radiation irradiating curability is given to this light transmissive resin, which can become a radiation irradiating curing type. Radiation is a general name of such as visible light beam, ultra-violet ray, far infrared ray, X-ray and electronic beam, and in particular, ultra-violet ray is generally used. The radiation irradiating curing resin is not cured until radiation is irradiated unlike thermoplastic or thermosetting resin which start to be cured when discharged. Therefore, they are more suitable to form the lens portions 2 according to exemplary embodiments of the present invention for which the lens portions 2 are coupled at the constricted portion 3 and heads of each lens portions 2 are flatly coupled, resulting in the row 20.

Moreover, in order to enhance light diffusibility of the lens portions 2 formed of the light transmissive resin, it is preferable to mix the light diffusive particles. As for the light diffusive particles, particles such as silica, alumina, titania, calcium carbonate, aluminium hydrated, acrylic resin, organic silicone resin, polystyrene, urea resin and formaldehyde condensate can be listed, and one type of these or some types of these are mixed to be used. In order that the light diffusive particles can make full use of light diffusibility, refraction factor of the light transmissive particles must be sufficiently different from that of the light transmissive resin. For such light diffusive particles, it is preferable to enhance dispersibility of the light diffusive particles to the light transmissive resin by carrying out coating processing to the light diffusive particles surface with surfactants such as silicon or fluorine resin, or covering with melted resin. Thus, flowability of the light transmissive resin in which the light diffusive particles are dispersed, can be maintained, and is properly discharged from the discharging head 116.

Figure 8:
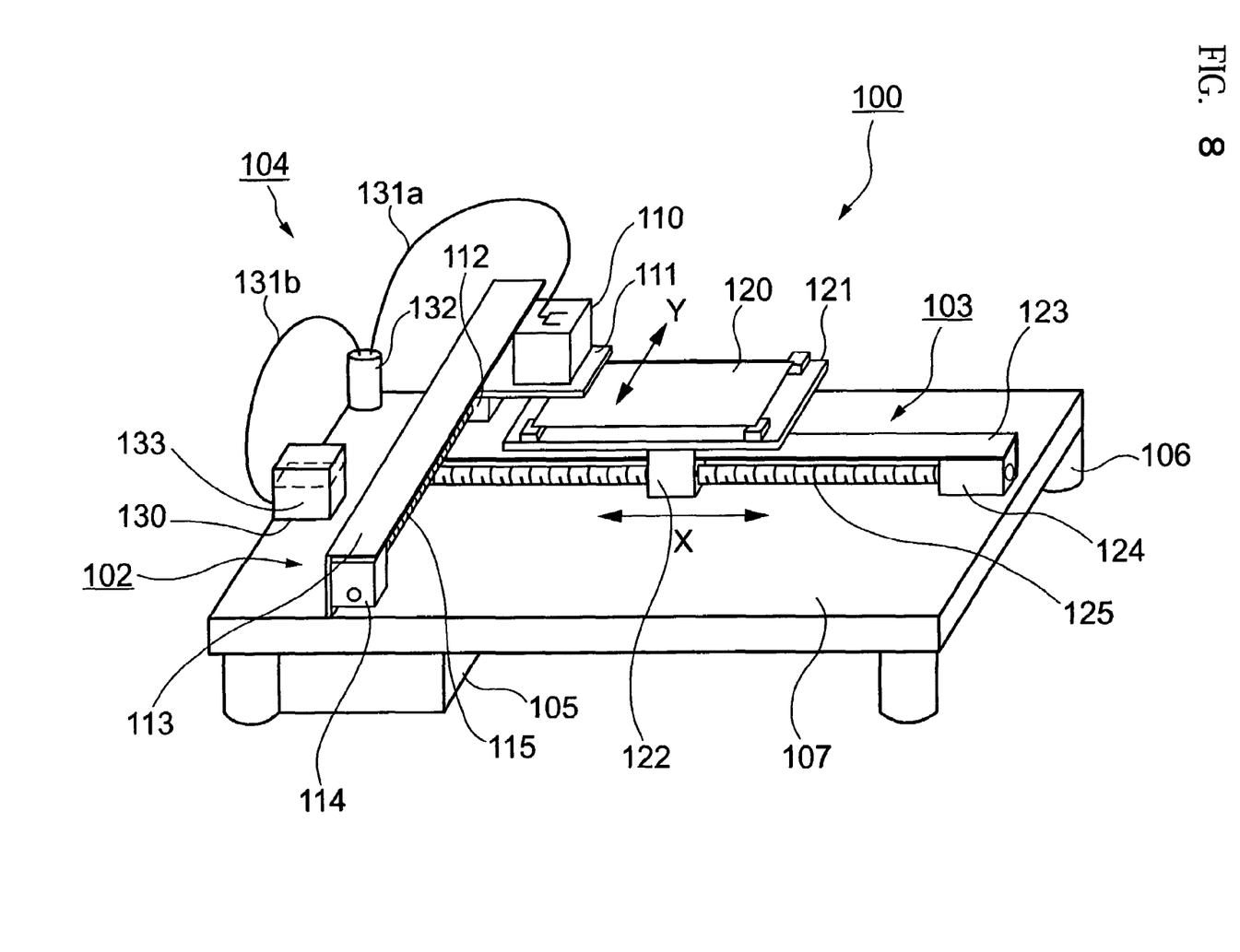
FIG. 8 is a schematic outlined perspective view showing a droplet discharging device.

Next, the droplet discharging device 100 used to form the above described microlens 1 is described in detail. As shown in FIG. 8, the droplet discharging device 100 includes a head mechanism part 102 having a head part 110 discharging the droplet 10, a work mechanism part 103 provided with a work 120 which is the discharging object of the droplet 10 discharged from the head part 110, a liquid supply part 104 supplying a liquid 133 of the light transmissive resin which becomes the droplet 10 to the head part 110 and a control part 105 for controlling the respective mechanism parts and supply part.

The droplet discharging device 100 is provided with a plurality of supporting legs 106 installed on floor, and a surface plate 107 installed above the supporting legs 106. Above the surface plate 107, the work mechanism part 103 is disposed so as to extend in a longitudinal direction (X-axis direction) of the surface plate 107. Above the work mechanism 103, the head mechanism part 102 supported at the both ends by two columns fixed to the surface plate 107 is disposed, so as to extend in a direction (Y-axis direction) perpendicular to the work mechanism part 103. Furthermore, above one end part of the surface plate 107, a liquid supply part 104 communicated with the head part 110 of the head mechanism part 102 to supply the liquid 133, is disposed. Furthermore, the control part 105 is housed under the surface plate 107.

The head mechanism part 102 is provided with the head part 110 discharging the liquid 133, a carriage 111 on which the head part 110 is mounted, a Y-axis guide to guide movement of the carriage 111 in Y-axis direction, a Y-axis ball screw 115 installed in the Y-axis direction under the Y-axis guide 113, a Y-axis motor to rotate the Y-axis ball screw 115 forward and reverse, and a carriage screwing part 112 on which a female thread is formed, to move the carriage 111 by screwing with the Y-axis ball screw 115 under the carriage 111.

The work mechanism part 103 is positioned under the head mechanism part 102, and disposed in the X-axis direction in generally the same structure as the head mechanism part 102. The work mechanism part 103 includes a work 120, a mounting table 121 mounting the work 120, a X-axis guide 123 to guide movement of the mounting table 121, an X-axis ball screw 125 installed under the X-axis guide 123, a X-axis motor 124 to rotate the X-axis ball screw 125 forward and reverse, and a mounting table screwing part 122 positioned under the mounting table 121 and moving the mounting table 121 by screwing with the X-axis ball screw 125.

In addition, the head mechanism part 102 and the work mechanism part 103 are respectively provided with a position detecting device (not shown), detecting positions where the head part 110 and the mounting table 121 move to. Furthermore, the carriage 111 and the mounting table 121 incorporate a mechanism to adjust the rotating direction (so called, θ axis), which allows the rotating direction adjustment by using the center of the head part 110 as a rotating center and the rotating direction adjustment of the mounting table 121.

According to these structures, the head part 110 and the work 120 can freely move to reciprocate in Y-axis direction and X-axis direction respectively. First, movement of the head part 110 is described. The Y-axis ball screw 115 rotates forward and reverse by the forward and reverse rotation of the Y-axis motor 114, and by the movement of the carriage screwing part 112 screwed with the Y-axis ball screw 115 along the Y-axis guide 113, the carriage 111 integrated with the carriage screwing part 112 moves to an arbitrary position. In other words, by the driving of the Y-axis motor 114, the head part 110 mounted on the carriage 111 freely moves in the Y-axis direction. Similarly, the work 120 mounted on the mounting table 121 also freely moves in the X-axis direction.

In this way, the head part 110 is structured to move to the discharging position in the Y-axis direction and stop, synchronize with the movement of the work 120 positioned downward in the X-axis direction, and discharge the droplet 10. The predetermined drawing or the like can be carried out on the work 120 by relatively controlling the work 120 moving in the X-axis direction and the head part 110 moving in the Y-axis direction.

Next, the liquid supply part 104 for supplying the liquid 133 to the head part 110 comprises a tube 131a for forming a flow passage communicating with the head part 110, a pump 132 for feeding the liquid to the tube 131a, a tube 131b (flow passage) for supplying the liquid 133 to the pump 132, and a tank 130 communicating with the tube 131b for storing the liquid 133, and is disposed on one end of the surface plate 107. Considering refilling and replacement of the liquid 133, the tank 130 is preferably installed above or under the surface plate 107, however, for the disposition, if it is installed above the head part 110, the liquid can be naturally supplied with gravity by jointing the tank 130 and the head part 110 with one flexible tube without installing the pump 132.

Figure 9A:
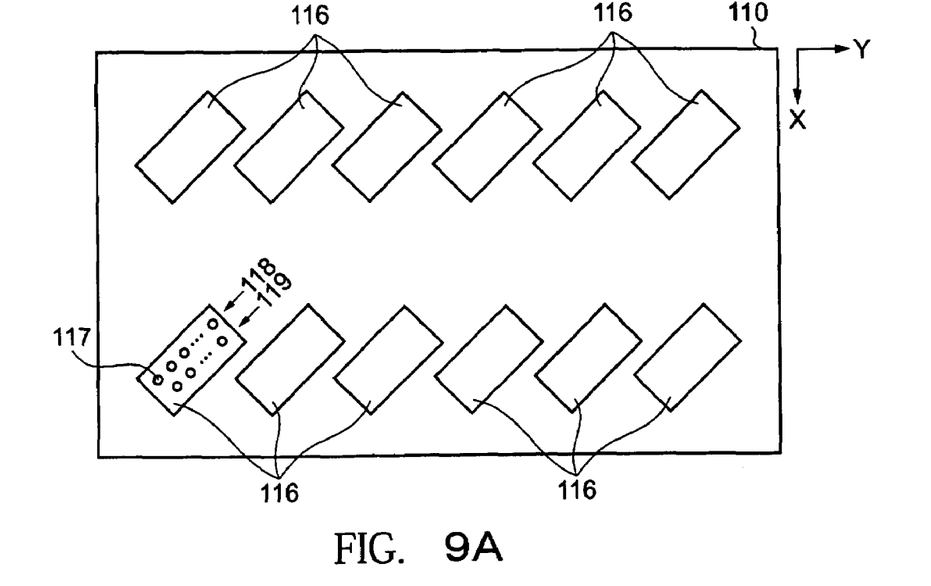
FIGS. 9A-B are schematic structural views showing a structure of a discharging head in the droplet discharging device.

As shown in FIG. 9(a), the head part 110 has a plurality of discharging heads 116 mutually having the same structure. Here, FIG. 9(a) is a figure viewing the head part 110 from the mounting table 121 side. On the head part 110, there are disposed two rows of which the row including six discharging heads 116 so that the longitudinal direction of the respective discharging heads 116 forms an angle to the X-axis direction. Further, the discharging heads 116 for discharging the liquid 133 have two nozzle rows 118 and 119 respectively extending in the longitudinal direction of the discharging head 116. One of the nozzle row is a row with 180 pieces of nozzles 117 disposed in one row respectively, and the interval of the nozzles 117 along the direction of these nozzle rows 118 and 119 is approximately 140 µm. The nozzles 117 between two of the nozzle row 118 and 119 are respectively disposed to be shifted by half pitch (approximately 70 µm).

Figure 9B:
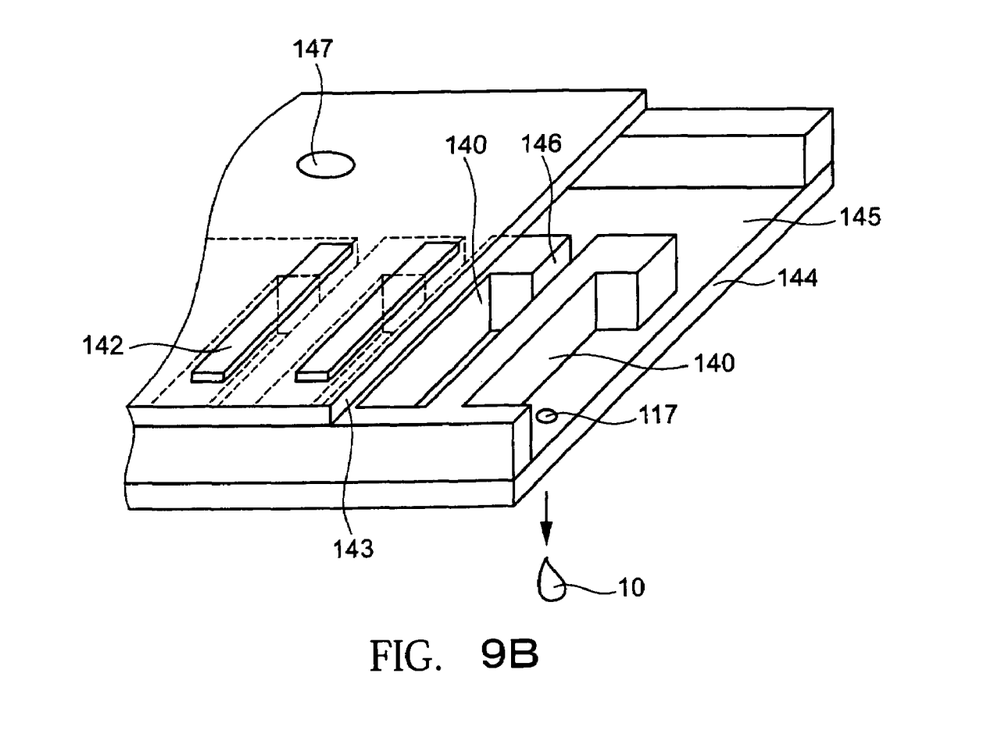
Figure 10:
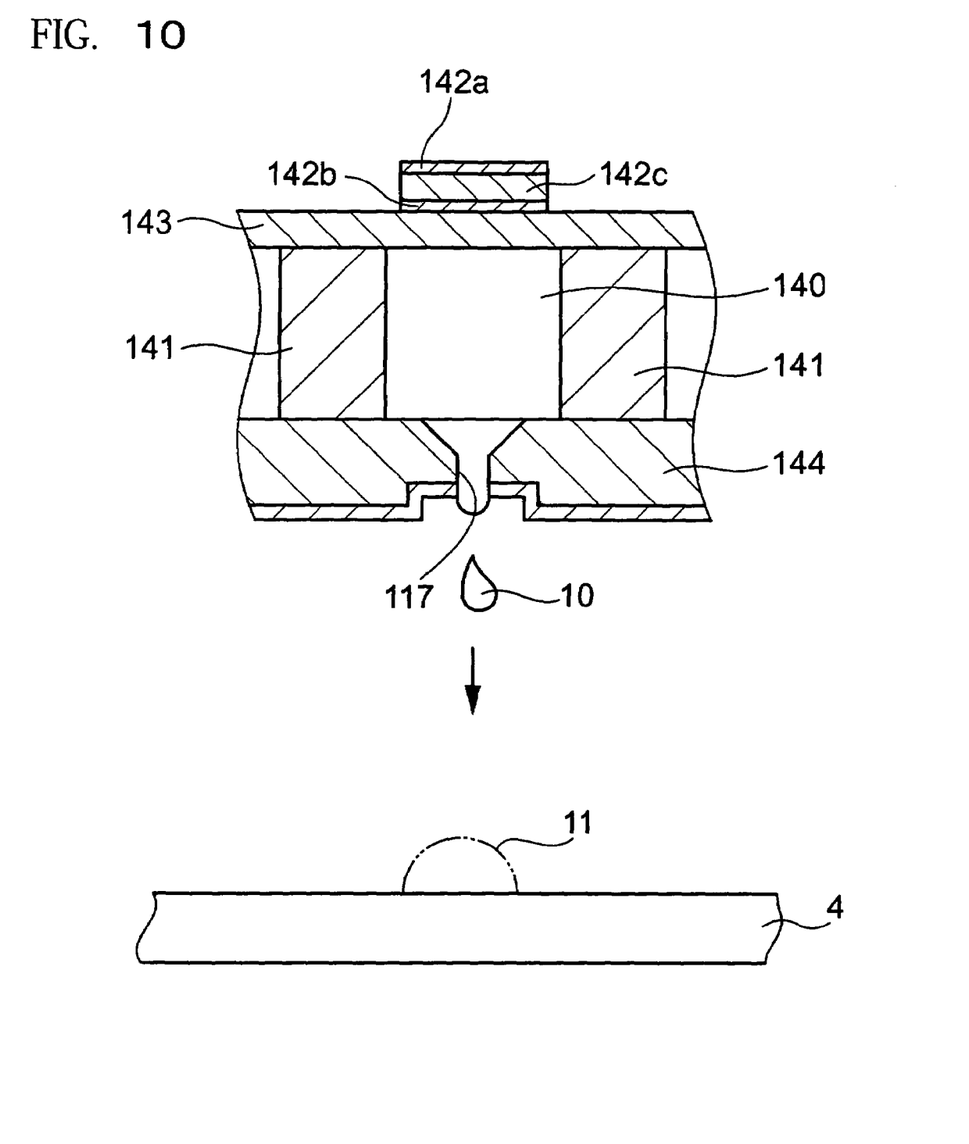
FIG. 10 is a schematic sectional view showing discharging state of the droplet.

As shown in FIG. 9(b) and FIG. 10, the respective discharging heads 116 are provided with a vibrating plate 143 and a nozzle plate 144. Between the vibrating plate 143 and nozzle plate 144, there is located a liquid reservoir 145 where the liquid 133 supplied from the tank 130 through a hole 147 is always filled. Furthermore, a plurality of bulkheads 141 are located between the vibrating plate 143 and the nozzle plate 144. Then, an area surrounded by the vibrating plate 143, the nozzle plate 144 and a pair of the bulkheads 141 is a cavity 140. The cavity 140 is provided in correspondence with the nozzles 117, therefore, the number of the cavities 140 is same as the number of the nozzles 117. The liquid 133 is supplied to the cavity 140 from the liquid reservoir 145 through a supply port 146 located between a pair of the bulkheads 141.

As shown in FIG. 10, an oscillator 142 is located on the vibrating plate 143 in correspondence with the each cavity 140. The oscillator 142 comprises a piezo actuator 142c, and a pair of electrodes 142a and 142b sandwiching the piezo actuator 142c. By applying driving voltage to this pair of electrodes 142a and 142b, the liquid 133 is discharged from the corresponded nozzles 117 as the droplet 10. In addition, volume of the droplet 10 discharged from each of the nozzles 117 is variable between 0 pl and 42 pl (pico liter). In addition, in order to discharge the liquid 133, electricity-heat transforming element may be used in place of the oscillator 142, which is structured so that the thermal expansion of the liquid 133 by the electricity-heat transforming element is used to discharge the liquid 133.

Here, a process to discharge the droplet 10 by the droplet discharging device 100 and to form the microlens 1 is briefly described. First, the transparent substrate 4 on which liquid repellent processing is carried out is mounted on the mounting table 121 as a work 120, and for the mounting direction, for example, the direction of the row 20a shown in FIG. 4 is X-axis direction. While the discharging head 116 relatively moves in the Y-axis direction, as shown in FIG. 10, the discharging head 116 discharges the droplet 10 of the light transmissive resin from the nozzles 17 to sequentially dispose the lump 11 on the transparent substrate 4, and as shown in FIG. 4, a row 20a of the lens portions 2a is formed in X-axis direction. The interval between the centers of a plurality of the rows 20a formed is, in this case, 70 µm, and the droplet 10 is discharged from a plurality of nozzles 117 corresponding to this interval to form a plurality of the rows 20a, further, the nozzles 117 are relatively moved in the Y-axis direction, scanning in the X-axis direction forming necessary number of rows is repeated, and then all rows of the row 20a are formed. Next, in order to cure the formed rows 20a, for example, if the light transmissive resin forming the rows 20a is ultraviolet irradiating curing type, ultraviolet ray is irradiated. After the row 20a is cured, the nozzles 117 discharging the droplet 10 of the light transmissive resin for the lens portions 2b are moved to the position of the row 20b, and the row 20b is formed in the same way as the row 20a, then the microlens 1 is completed. By using this droplet discharging device 100, not only for mass-production but also for trial in production of single unit can be quickly handled, resulting in schedule reduction for trial of new product.

As described above, if the microlens 1 is manufactured using the droplet discharging device 100, by controlling the relative movement of the nozzles 117 of the droplet discharging device 100 and the mounting table 121, and also the size and the discharging timing of the droplet 10 discharged from the nozzles 117, the microlens 1 corresponding to various specifications differing in size of the transparent substrate 4, size of the lens portions 2 and their layouts or the like can be produced. Furthermore, this is a manufacturing method of the microlens 1 which can reduce manufacturing cost without necessity of storing many dies according to the specification of the microlens 1 and without loss of materials such as the light transmissive resin used.

What is claimed is:

1. A manufacturing method of a microlens, comprising:
   forming generally convex shaped lens portions made from light transmissive resin on a substrate having light transmissivity, the forming including discharging a droplet of the light transmissive resin from a droplet discharging device to form the lens portions, and forming a plurality of the lens portions so as to be coupled abutting each other on the substrate;
   wherein light diffusive particles are mixed and dispersed in the light transmissive resin; and
   curing the lens portions.

2. The manufacturing method of a micro lens according to claim 1, the forming the lens portions comprising:
   forming a plurality of rows on which the lens portions are coupled abutting each other, to extend in a predetermined interval;
   curing the lens portions formed in the forming the plurality of rows; and
   forming a row on which the lens portions are coupled abutting each other to extend between a plurality of the rows formed in the forming the plurality of rows.

3. The manufacturing method of a microlens according to claim 2, the lens portions formed in the forming the plurality of rows and the forming the row are respectively formed by the processes to discharge the droplet of a different light transmissive resin.

4. The manufacturing method of a microlens according to claim 1, further comprising performing liquid repellent processing on a surface of the substrate on which the lens portions are formed.

5. A microlens, comprising:
   a substrate having light transmissivity; and
   generally convex shaped lens portions formed on the substrate and made from curable light transmissive resin, a plurality of the lens portions covering an entire surface of the substrate, and being formed to be respectively coupled abutting each other on the substrate,
   the curable light transmissive resin containing light diffusive particles.

6. The microlens according to claim 5, the surface of the substrate on which the lens portions are formed having liquid repellency.

7. An optical film, comprising the microlens according to claim 5.

8. A screen for projection, comprising:
a fresnel lens and a lenticular sheet,
the optical film according to claim 7, being used for the lenticular sheet.

9. A projector system, comprising:
a light source;
a light modulating device modulating light emitted from the light source;
an imaging optical system to image light modulated by the light modulating device; and
a screen for projecting an image that is imaged by the imaging optical system to form a projected image,
wherein the screen for projection according to claim 8, is being used as the screen for projecting.

* * * * *